US010420324B2

(12) United States Patent
Wilhelm

(10) Patent No.: US 10,420,324 B2
(45) Date of Patent: Sep. 24, 2019

(54) MAGNETIC TOWER

(71) Applicant: Doskocil Manufacturing Company, Inc., Arlington, TX (US)

(72) Inventor: Josiah Wilhelm, Columbia Station, OH (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 6 days.

(21) Appl. No.: 15/792,859

(22) Filed: Oct. 25, 2017

(65) Prior Publication Data

US 2019/0021282 A1  Jan. 24, 2019

Related U.S. Application Data

(60) Provisional application No. 62/535,009, filed on Jul. 20, 2017.

(51) Int. Cl.
*A01K 15/02* (2006.01)
*A63H 33/04* (2006.01)
*A63H 33/26* (2006.01)
*A63H 15/06* (2006.01)

(52) U.S. Cl.
CPC ........... *A01K 15/02* (2013.01); *A01K 15/025* (2013.01); *A63H 15/06* (2013.01); *A63H 33/046* (2013.01); *A63H 33/26* (2013.01)

(58) Field of Classification Search
CPC ...... A63H 15/06; A63H 33/26; A63H 33/046; A01K 15/025
See application file for complete search history.

(56) References Cited

U.S. PATENT DOCUMENTS

| | | | | |
|---|---|---|---|---|
| 2,833,244 A | * | 5/1958 | Bohlman | A01K 15/025 119/708 |
| 3,156,472 A | * | 11/1964 | Brock | F16C 32/0427 369/244.1 |
| 3,217,446 A | * | 11/1965 | Steiert | A63H 33/26 446/138 |
| 3,337,984 A | * | 8/1967 | Tomasello | A63H 1/00 446/138 |
| 3,908,307 A | * | 9/1975 | Jacobson | A63H 33/26 273/456 |
| 4,295,832 A | * | 10/1981 | Karell | A63F 9/0098 273/456 |
| 5,135,425 A | * | 8/1992 | Andrews | A63H 33/26 335/306 |
| 5,322,036 A | * | 6/1994 | Merino | A63H 15/04 119/707 |
| 5,806,465 A | * | 9/1998 | Baiera | A01K 15/025 119/707 |

(Continued)

*Primary Examiner* — Eugene L Kim
*Assistant Examiner* — Alyssa M Hylinski
(74) *Attorney, Agent, or Firm* — Global IP Counselors, LLP

(57) ABSTRACT

A magnetic tower pet toy includes a base, a pole member, and an arm. The base has a bottom portion and an extension extending from the bottom portion, the extension including a base magnet disposed therein. The pole member extends from the extension. The arm member includes an opening configured to receive the pole member and a first magnet. The first magnet is configured to be repelled by the base magnet such that the arm member is disposed spaced away from the extension and capable of rotating about the pole member.

20 Claims, 8 Drawing Sheets

(56) References Cited

U.S. PATENT DOCUMENTS

| | | | | |
|---|---|---|---|---|
| 5,875,737 | A | * | 3/1999 | Boshears ............. A01K 15/024 |
| | | | | 119/706 |
| 5,913,707 | A | * | 6/1999 | Roman ................. A63H 33/26 |
| | | | | 428/16 |
| 6,016,771 | A | * | 1/2000 | Baiera ................. A01K 15/025 |
| | | | | 119/707 |
| 6,217,408 | B1 | * | 4/2001 | Willinger ............. A01K 15/025 |
| | | | | 119/707 |
| D661,847 | S | * | 6/2012 | Christianson ................ D30/160 |
| 2004/0011299 | A1 | * | 1/2004 | Lamson-Scribner ........................ |
| | | | | A01K 15/025 |
| | | | | 119/708 |
| 2011/0265374 | A1 | * | 11/2011 | Tompkins, IV ........ A01G 13/10 |
| | | | | 47/31.1 |

* cited by examiner

MAGNETIC TOWER

CROSS-REFERENCE TO RELATED APPLICATIONS

This application is a non-provisional utility application that claims priority to U.S. Provisional Patent Application No. 62/535,009 filed on Jul. 20, 2017. The entire disclosure of U.S. Patent Application No. 62/535,009 is hereby incorporated herein by reference.

BACKGROUND

Field of Invention

The present invention relates to a magnetic tower pet toy. In particular, the present invention relates to a magnetic tower pet toy that can increase the animal enjoyment.

Background to the Invention

There are many pet toys for exercising and playing with a pet. Pet owners, particularly cat owners, exercise and play with their pets by dangling various objects in front of them. In cats, this arouses instinctual as well as playful behavior that is desired by pet owners.

Despite the advancements in the art, there is always a need for a pet toy which sustains a pet's attention for longer periods of time to entice the pet to play and maintain prolonged engagement and interest in the toy. Many pets have a relatively short attention span and are easily bored.

SUMMARY

It has been discovered that to prolong engagement and interest in the toy an improved pet toy would be desired. In view of the state of the known technology, one aspect of the present disclosure is to provide a magnetic tower pet toy comprising a base, a pole member, and an arm. The base has a bottom portion and an extension extending from the bottom portion, the extension including a base magnet disposed therein. The pole member extends from the extension. The arm member includes an opening configured to receive the pole member and a first magnet, the first magnet configured to be repelled by the base magnet such that the arm member is disposed spaced away from the extension and capable of rotating about the pole member.

BRIEF DESCRIPTION OF THE DRAWINGS

The Figures illustrate an embodiment of a magnetic tower pet toy.

DETAILED DESCRIPTION OF THE EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
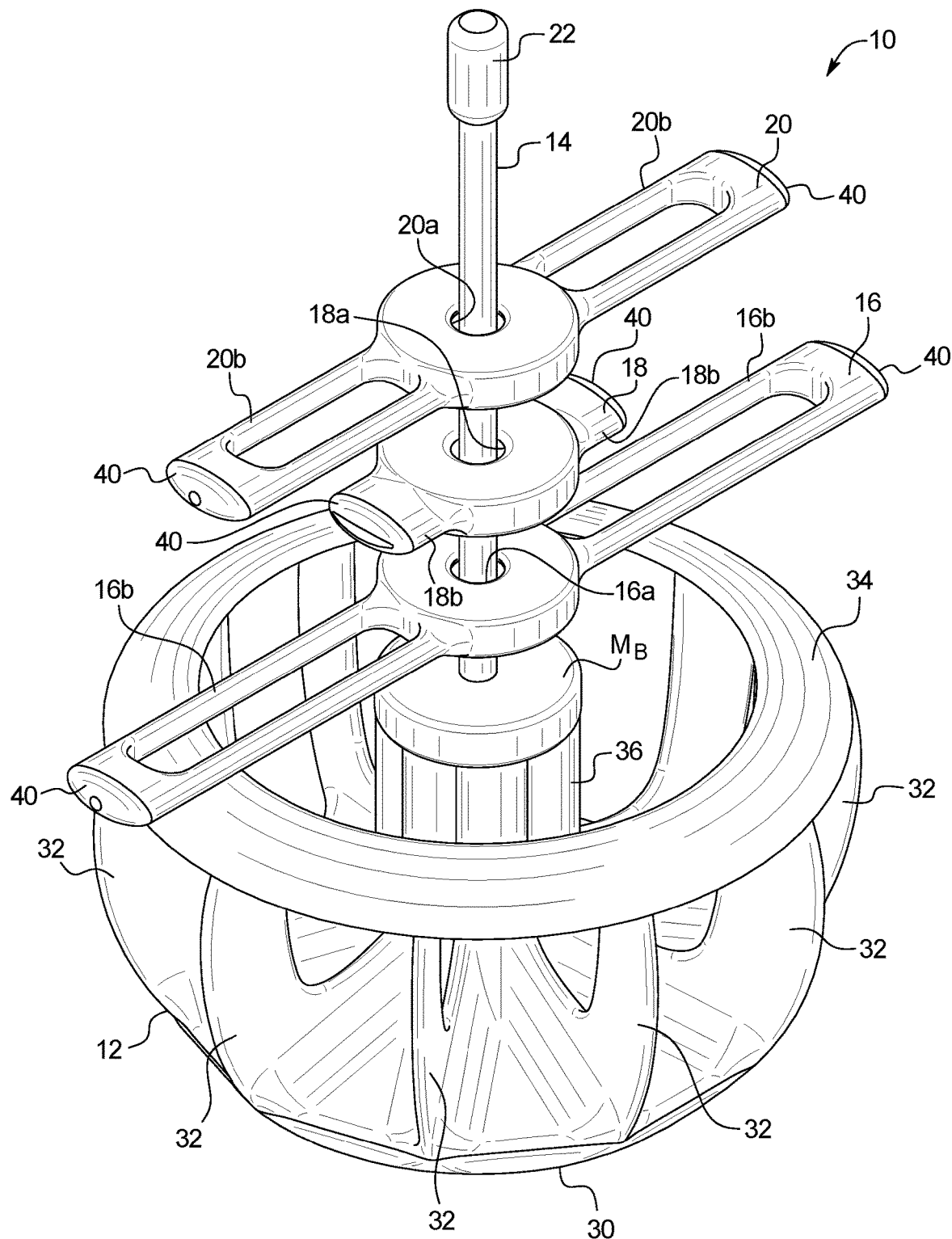
FIG. 1 is a perspective view of a magnetic tower pet toy having a base, a pole member, a first arm, a second arm, a third arm and a cap, in accordance with one embodiment.

Referring initially to the FIG. 1, a magnetic tower pet toy 10 (also referred to as the pet toy 10) is illustrated in accordance with a first embodiment. The magnetic tower pet toy 10 includes a base 12, a pole member 14, a first arm 16 (an arm member), a second arm (an arm member) 18, a third arm 20 (an arm member) and a cap 22.

Figure 2:
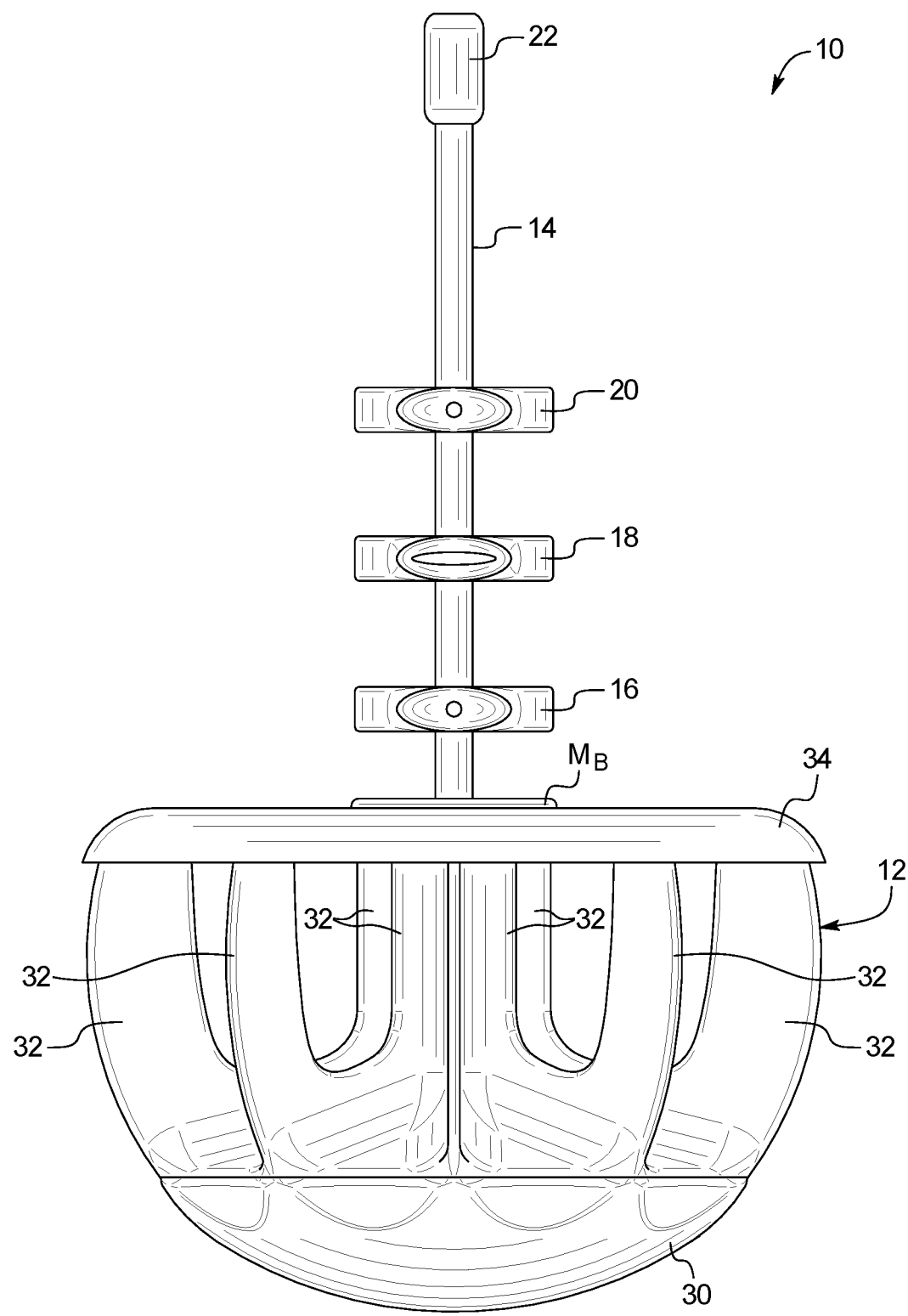
FIG. 2 is a first side view of the magnetic tower pet toy showing the base, the pole member, one end of the first arm, one end of the second arm, one end of the third arm and the cap, in accordance with the embodiment.
Figure 3:
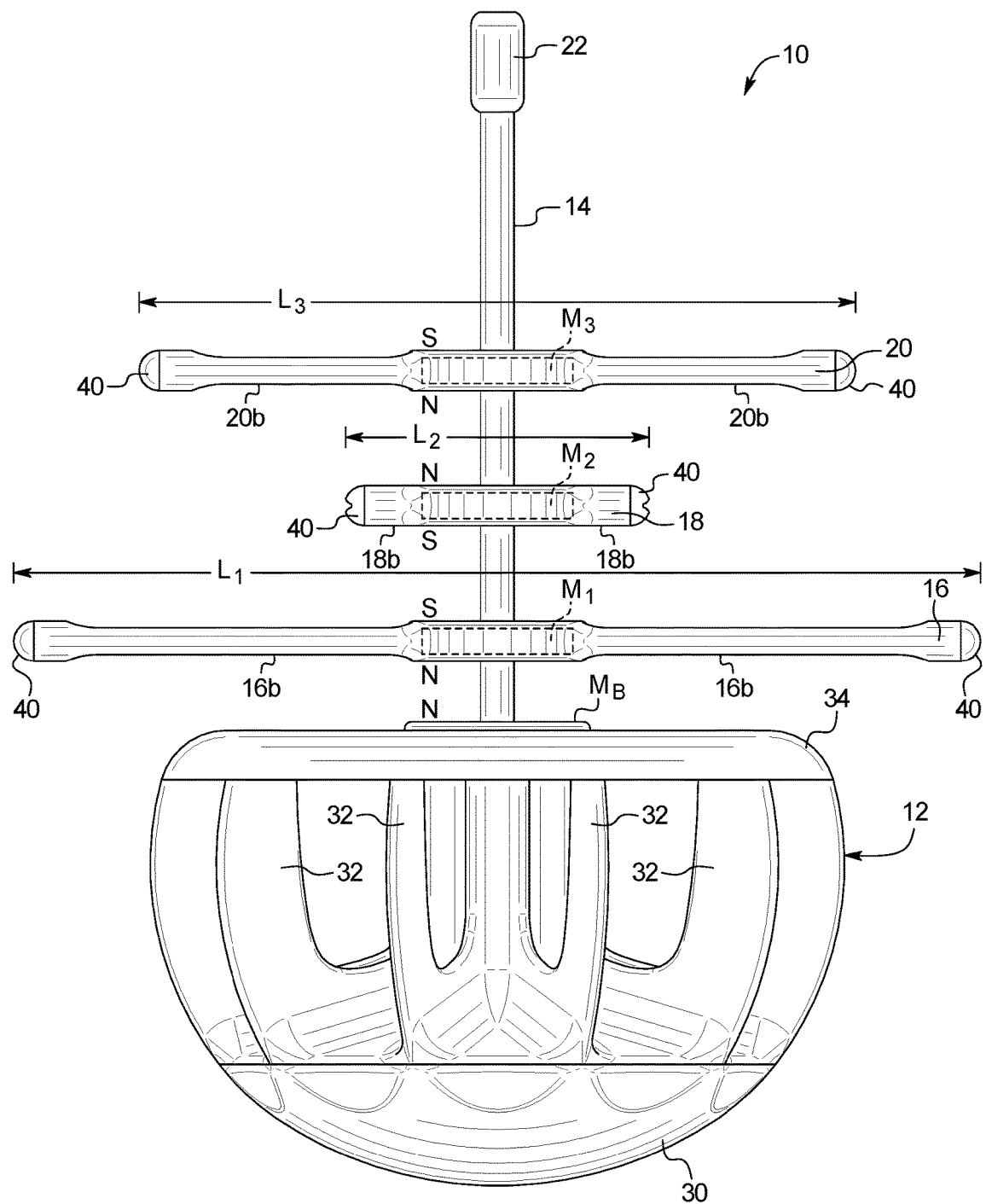
FIG. 3 is a second side view of the magnetic tower pet toy showing the base, the pole member, one side of the first arm, one side of the second arm, one side of the third arm and the cap, in accordance with the embodiment.
Figure 4:
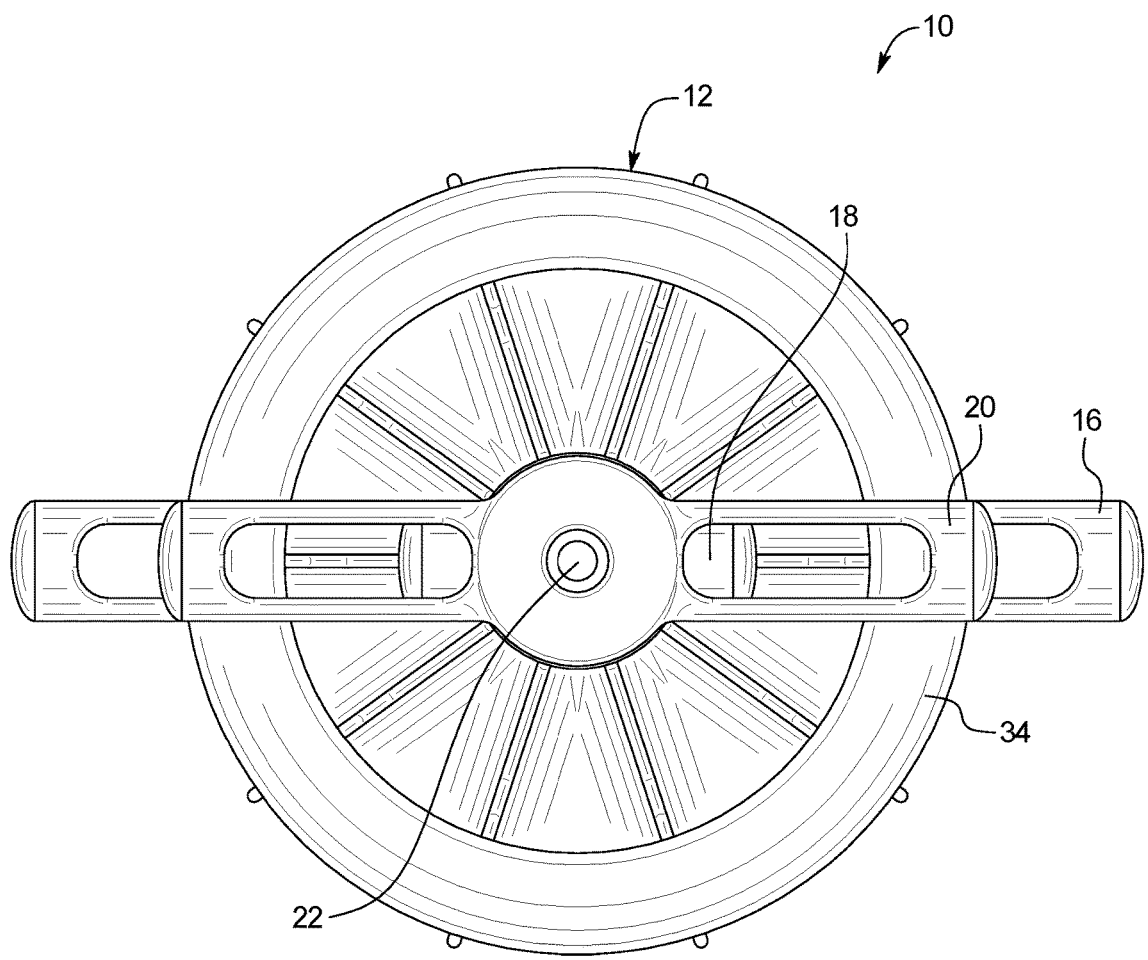
FIG. 4 is a top view of the magnetic tower pet toy in accordance with the embodiment.
Figure 5:
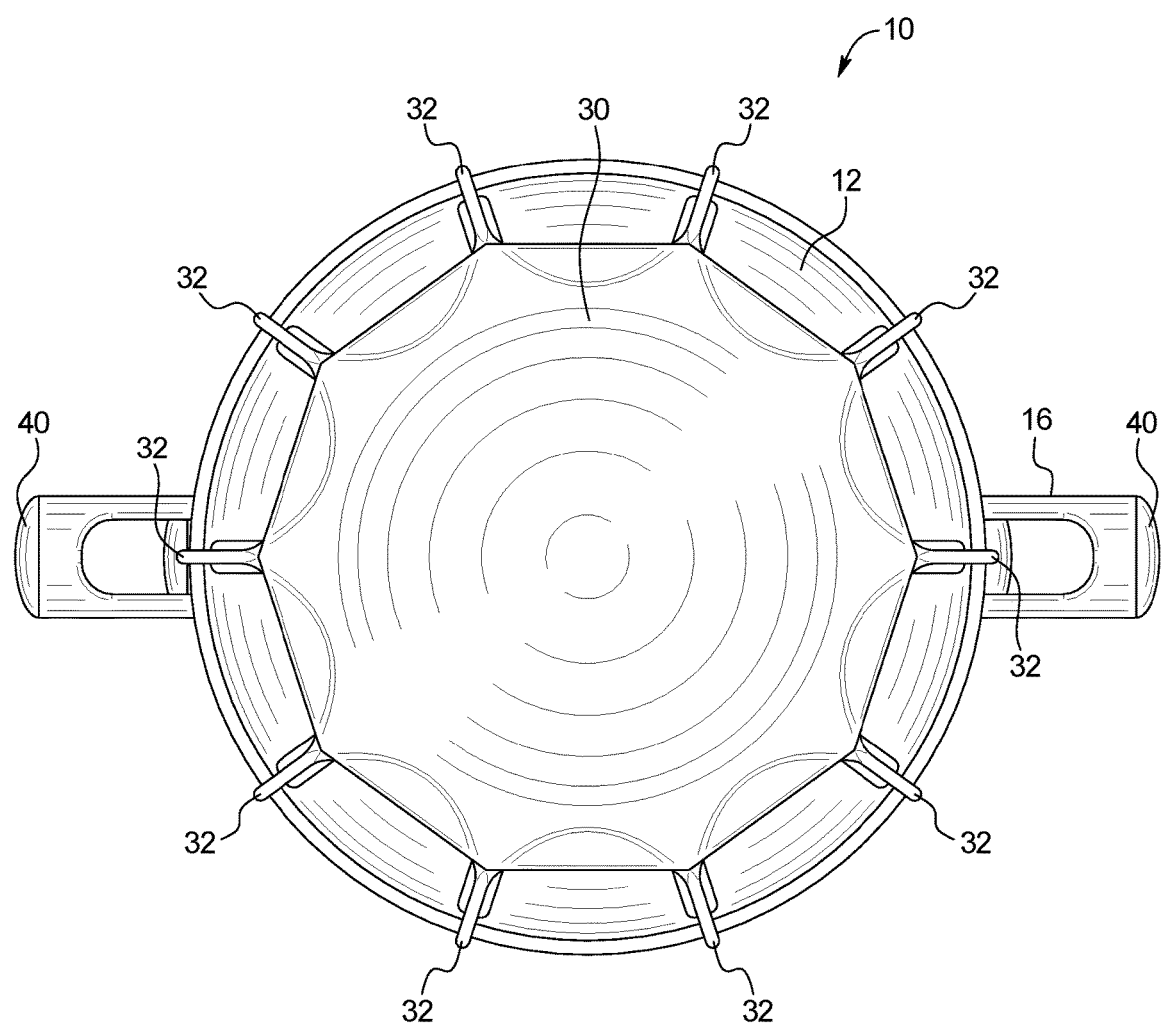
FIG. 5 is a bottom view of the magnetic tower pet toy in accordance with the embodiment.
Figure 8:
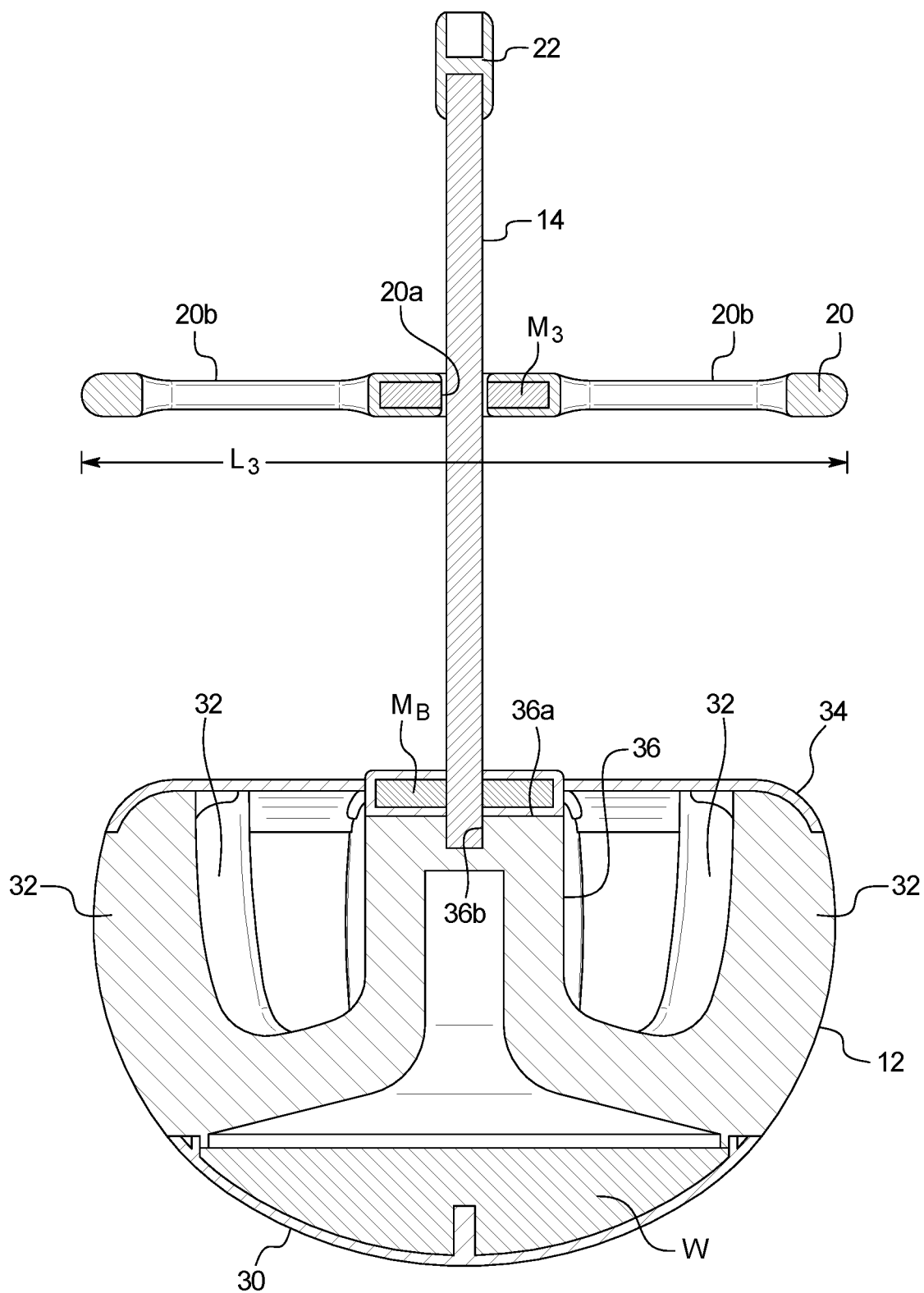
FIG. 8 is a cross-sectional view of the magnetic tower pet toy with two of the arms removed, showing a magnet with the depicted one of the first, second and third arms and a magnet within the base, in accordance with the embodiment.

The base 12 is preferably formed from molded plastic or any other suitable material, and has a bottom portion 30, a plurality of post-like sections 32 (hereinafter referred to as post sections 32), an upper annular ring 34 and an extension 36 extending from the bottom portion 30. The bottom portion 30 is a basically a weight supporting structure that encloses a weight W, as shown in FIG. 8. As shown in FIGS. 1, 2 and 3, the base 12, and in particular the bottom portion 30, is preferably formed with a semi-spherical, hemisphere or other rounded shape. More specifically, the bottom portion 30 can thus enable the pet toy 12 to wobble or rock in various directions.

The post sections 32 of the base 12 are ribs or spoke-like structures that curve and extend upward from the bottom portion 30 to the upper annular ring 34. The bottom portion 30, the post section 32, the upper annular ring 34 and the extension 36 can be formed as a single unitary, monolithic element, or, alternatively, can be assembled from separate members that are fixed to one another by fasteners (not shown), fused or adhered to one another by an adhesive material, depending upon the manufacturing techniques used to manufacture the magnetic tower pet toy 10.

The extension 36 extends upward from the bottom portion 30 and is encircled by the upper annular ring 34. Recesses, openings or open areas are defined between adjacent ones of the post sections 32, and also around the extension 36 above the bottom portion 30. Further, the upper annular ring 34 is spaced apart from the extension 36, thereby defining an upper annular gap therebetween open to the recesses defined between the post sections 32 and the extension 36. The open areas and annular gap provide an overall decrease in weight of the base 12. Moreover, lower inner parts of the post sections 32 serve as internal ribs that extend radially inward from the post sections 32 to the extension 36 increasing overall rigidity of the base 12 without significantly increasing the overall weight of the base 12. The weight W, as shown in FIG. 8, is located at a bottom-most area of the bottom portion 30 of the base 12. The bottom-most area of the bottom portion 30 is a central weight supporting portion of the base, retaining the weight W therein. The weight W serves to maintain the pet toy 10 in an upright position. Further, the weight W is dimensioned and positioned such that gravity urges the pole member 14 toward an upright vertical orientation.

The extension 36 is generally cylindrical and extends upwardly from the bottom portion 12. In an alternative embodiment, the extension 36 can have a center portion that has an outer diameter that is less than its upper and lower ends. The extension 36 defines an upper surface 36a with a base magnet $M_B$ fixed thereto or encased therein. The extension 36 is preferably centered between the plurality of post sections 32 and centered relative to the upper annular ring 34.

The pole member 14 can be plastic or any other suitable material and extends from the extension 36. More specifically, the pole member 14 is inserted into an opening 36b (FIG. 8) formed in the extension 36. The pole member 14 is basically a rod with a round or cylindrical shape and has an outer diameter that is significantly less than the diameter of the extension 36. The cap 22 is dimensioned and sized to snuggly fit around the top end of the pole member 36 such that the cap 22 prevents the first arm 16, the second arm 18 and the third arm 20 from accidently being removed or coming loose from the pole member 14.

As shown in FIGS. 1 and 3, the first arm 16, the second arm 18 and the third arm 20 have differing lengths. Specifically, as shown in FIG. 3, the first arm member 16 has a first overall length $L_1$, the second arm member 18 has a second overall length $L_2$ that is less than the first overall length $L_1$, and the third arm member 20 has a third overall length $L_3$ that is less than the first overall length $L_1$ and greater than the second overall length $L_2$.

Other than their respective overall lengths, the first arm 16, the second arm 18 and the third arm 20 each have the same features. For example, the first arm 16 includes an opening 16a and a first magnet $M_1$. The second arm 18 includes an opening 18a and a second magnet $M_2$. The third arm 20 includes an opening 20a and a third magnet $M_3$.

The opening 16a of the first arm 16 is centered relative to the first overall length $L_1$ of the first arm 16. Further, the first magnet $M_1$ has an annular shape with a central aperture that encircles and is co-axial with the opening 16a. Similarly, the opening 18a of the second arm 18 is centered relative to the second overall length $L_2$ of the second arm 18, and the second magnet $M_2$ has an annular shape with a central aperture that encircles and is co-axial with the opening 18a. As well, the opening 20a of the third arm 20 is centered relative to the third overall length $L_3$ of the third arm 20, and the third magnet $M_3$ has an annular shape with a central aperture that encircles and is co-axial with the opening 20a.

When the first arm 16, the second arm 18 and the third arm 20 are fully assembled to the base 12 and the pole member 14 as shown in FIGS. 1-3, the pole member 14 extends through each of the openings 16a, 18a and 20a. Further, as shown in FIG. 3, when fully assembled, the polarity of each of the magnets $M_1$, $M_2$ and $M_3$ alternate. In other words, the north pole N of the base magnet $M_B$ faces the north pole of first magnet $M_1$, the south pole S of the first magnet $M_1$ faces to the south pole S of the second magnet $M_2$ and the north pole N of the second magnet $M_2$ faces the north pole of the third magnet $M_3$. Consequently, the first arm 16, the second arm 18 and the third arm 20 are oriented such that the base magnet $M_B$ repels the first magnet $M_1$, the first magnet $M_1$ repels the second magnet $M_2$, and the second magnet $M_2$ repels the third magnet $M_3$. As a result, in the absence of other forces acting on the base 12, the first arm 16, the second arm 18 and the third arm 20, the base 12, the first arm 16, the second arm 18 and the third arm 20 are all spaced apart from one another along the pole member 14 due to the repelling forces of the magnets $M_B$, $M_1$, $M_2$ and $M_3$.

Each of the first arm 16, the second arm 18 and the third arm 20 is preferably made of plastic, but can be made of other light-weight materials. Respective ones of the magnets $M_1$, $M_2$ and $M_3$ are centrally installed or encased in the plastic material. Further, the first arm 16 includes extending portions 16b that extend in opposite directions away from the first magnet $M_1$. The first overall length $L_1$ is measured end to end between the extending portions 16b. Open ends of each of the extending portions 16b are sealed with removable plugs or covers 40.

The second arm 18 includes extending portions 18b that extend in opposite directions away from the second magnet $M_2$. The second overall length $L_2$ is measured end to end between the extending portions 18b. Open ends of each of the extending portions 18b are sealed with removable plugs or covers 40.

The third arm 20 includes extending portions 20b that extend in opposite directions away from the third magnet $M_3$. The third overall length $L_3$ is measured end to end between the extending portions 20b. Open ends of each of the extending portions 20b are sealed with removable plugs or covers 40.

It should be understood that the openings 16a, 18a and 20a are dimensioned such that each of the first arm 16, the second arm 18 and the third arm 20 can freely rotate or spin about the pole member 14 and relative to the base 12.

Figure 6:
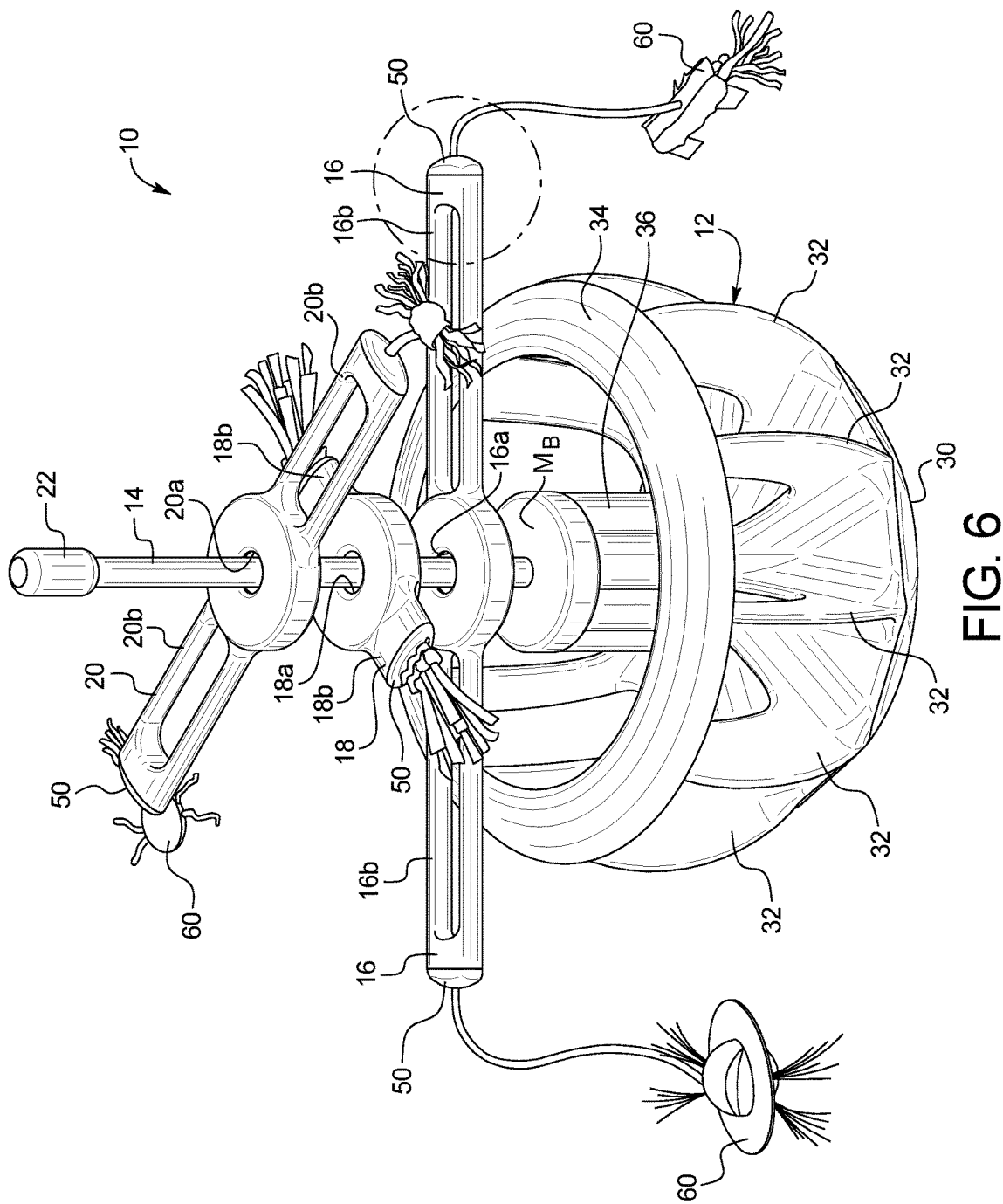
FIG. 6 is another perspective view of the magnetic tower pet toy showing various objects attached to opposite ends of each of the first, second and third arms in accordance with the embodiment.
Figure 7:
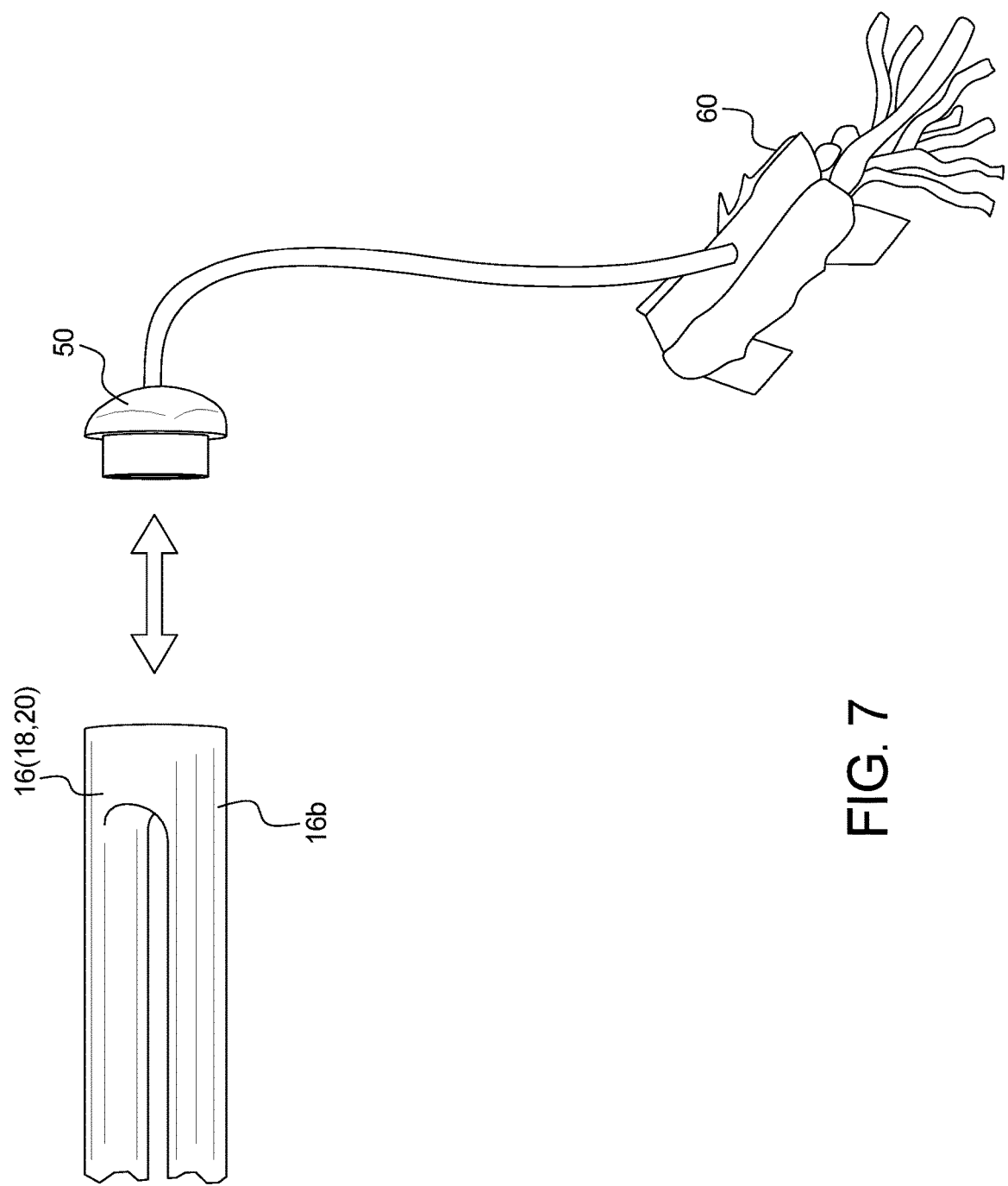
FIG. 7 is a side view of one end of the first, second and third arms of the magnetic tower pet toy showing one of the various objects being installed to the one end the first, second and third arms in accordance with the embodiment.

As shown in FIGS. 6 and 7, the covers 40 can be removed from the ends of the first, second and third arms 16, 18 and 20 and optional connecting members 50 can be inserted into the open ends of the first, second and third arms 16, 18 and 20. The connecting members 50 includes various dangling objects 60 or other play toys. As is shown, the connecting members 50 can be frictionally fit within the openings at opposite ends of the first, second and third arms 16, 18 and 20. The objects 60 attached to the connecting members 50 can have strings that attach thereto to enable the objects 60 to swing about freely or simply connect to the first, second and third arms 16, 18 and 20.

In the depicted embodiment, the first, second and third arms 16, 18 and 20 are shown installed to the base and the pole member 14. However, it should be understood from the drawings and the description herein that the pet toy 10 an be provided with only a single arm, such as only one arm selected of the first, second and third arms 16, 18 and 20. Alternatively, a plurality of additional arm members can be disposed on the pole member 14. In such a configuration, each arm member includes a magnet disposed in the central portion thereof. Thus, each magnet is repelled by the magnet below it, enabling each arm member to freely rotate around the pole member.

To assemble the toy, the pole member 14 is inserted into each of the openings 16a, 18a and 20a of the first, second and third arms 16, 18 and 20. One or more arm members are disposed on the pole member 14 by inserting the pole member 14 through the openings 16a, 18a and 20a, such that each adjacent magnet repels the magnet above it. The cap member 22 is then friction fitted or otherwise securely attached to the end of the pole member 14, preventing accidental removal of the first, second and third arms 16, 18 and 20.

Accordingly, an animal can play with the toy by batting or hitting the objects 60 and or the arm member with a paw thus causing the arm member to freely rotate around the pole member. The magnets causing the arm member to be positioned away from the end of the extension enable an almost frictionless rotation of the arm member. Moreover, the arm member can move longitudinal up and down on the pole member 14 (i.e., closer and further from the base magnet $M_B$), and/or in a pivoting manner (i.e., one arm member moving downward while the opposite arm portion moves upward). The animal's actions also may cause the rounded base 12 to cause the toy to wobble or oscillate. All of these movements can prolong engagement and interest in the toy.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A magnetic tower pet toy comprising:
    a base having a bottom portion and an extension extending from the bottom portion, the extension including a base magnet disposed therein;
    a pole member extending from the extension;
    a first arm member including a first opening configured to receive the pole member and a first magnet, the first magnet configured to be repelled by the base magnet such that the arm member is disposed spaced away from the extension and capable of rotating about the pole member; and
    a cover and a toy object, the cover and the toy object selectively releasably connected to an end of the first arm member.

2. The magnetic tower pet toy according to claim 1, wherein
    the bottom portion of the base member has a lower surface with a rounded or semi-spherical shape.

3. The magnetic tower pet toy according to claim 2, wherein
    the bottom portion of the base member includes a weight dimensioned and positioned such that gravity urges the pole member toward an upright vertical orientation.

4. The magnetic tower pet toy according to claim 3, wherein
    the weight is located within a central weight supporting portion of the base,
    the base further including a plurality of post sections that extend upward from the weight supporting portion to an upper surface of the base, with the extension being centered between the plurality of post sections.

5. The magnetic tower pet toy according to claim 4, wherein
    radially outward surfaces of the plurality of post sections and the weight supporting portion at least partially define the rounded or semi-spherical shape of the lower surface.

6. The magnetic tower pet toy according to claim 1, wherein
    the first opening of the first arm member is centered with respect to a lengthwise direction of the first arm member, with the first magnet being an annular member that encircles the first opening.

7. The magnetic tower pet toy according to claim 1, further comprising
    a second arm member including a second opening configured to receive the pole member and a second magnet, the second arm member being located above the first arm member, the second magnet being configured to be repelled by the first magnet such that the second arm member is disposed spaced away from the first arm member and is capable of rotating about the pole member.

8. The magnetic tower pet toy according to claim 7, wherein
    the second opening of the second arm member is centered with respect to a lengthwise direction of the second arm member, with the second magnet being an annular member that encircles the second opening.

9. The magnetic tower pet toy according to claim 7, further comprising
    a third arm member including a third opening configured to receive the pole member and a third magnet, the third arm member being located above the second arm member, the third magnet being configured to be repelled by the second magnet such that the third arm member is disposed spaced away from the second arm member and is capable of rotating about the pole member.

10. The magnetic tower pet toy according to claim 9, wherein
    the third opening of the third arm member is centered with respect to a lengthwise direction of the third arm member, with the third magnet being an annular member that encircles the third opening.

11. The magnetic tower pet toy according to claim 9, wherein
    the first arm member has a first overall length and
    the second arm member has a second overall length that is less than the first overall length.

12. The magnetic tower pet toy according to claim 11, wherein
    the third arm member has a third overall length that is less than the first overall length and greater than the second overall length.

13. A magnetic tower pet toy comprising:
    a base having a rounded or semi-spherical shaped lower surface and an upper surface with base magnet installed to a central portion thereof;
    a pole member extending from the upper surface of the base;
    a first arm member including a first opening configured to receive the pole member and a first magnet, the first magnet configured to be repelled by the base magnet such that the arm member is disposed spaced away from the extension and capable of rotating about the pole member; and a cover and a toy object, the cover and the toy object selectively releasably connected to an end of the first arm member.

14. The magnetic tower pet toy according to claim 11, wherein the base includes a weight supporting portion, a central extension extending upward from the weight supporting portion and a plurality of post sections that extend upward from the weight supporting portion, with the extension being centered between the plurality of post sections.

15. The magnetic tower pet toy according to claim 13, further comprising a second arm member including a second opening configured to receive the pole member and a second magnet, the second arm member being located above the first arm member, the second magnet being configured to be repelled by the first magnet such that the second arm member is disposed spaced away from the first arm member and is capable of rotating about the pole member.

16. The magnetic tower pet toy according to claim 15, wherein the second opening of the second arm member is centered with respect to a lengthwise direction of the second arm member, with the second magnet being an annular member that encircles the second opening.

17. The magnetic tower pet toy according to claim 15, further comprising a third arm member including a third opening configured to receive the pole member and a third magnet, the third arm member being located above the second arm member, the third magnet being configured to be repelled by the second magnet such that the third arm member is disposed spaced away from the second arm member and is capable of rotating about the pole member.

18. The magnetic tower pet toy according to claim 17, wherein the third opening of the third arm member is centered with respect to a lengthwise direction of the third arm member, with the third magnet being an annular member that encircles the third opening.

19. The magnetic tower pet toy according to claim 17, wherein the first arm member has a first overall length and the second arm member has a second overall length that is less than the first overall length.

20. The magnetic tower pet toy according to claim 19, wherein the third arm member has a third overall length that is less than the first overall length and greater than the second overall length.

\* \* \* \* \*